F. GOODWIN.
Corn-Planter.

No. 16,729.

Patented Mar. 3, 1857.

UNITED STATES PATENT OFFICE.

FIRMAN GOODWIN, OF ASTORIA, NEW YORK.

IMPROVEMENT IN SEED-PLANTERS.

Specification forming part of Letters Patent No. 16,729, dated March 3, 1857.

*To all whom it may concern:*

Be it known that I, FIRMAN GOODWIN, of Astoria, in the county of Queens and State of New York, have invented certain new and useful Improvements in Seeding-Machines; and I do hereby declare that the following is a full, clear, and exact description of the same, reference being had to the accompanying drawings, making a part of this specification, in which—

Figure 1:
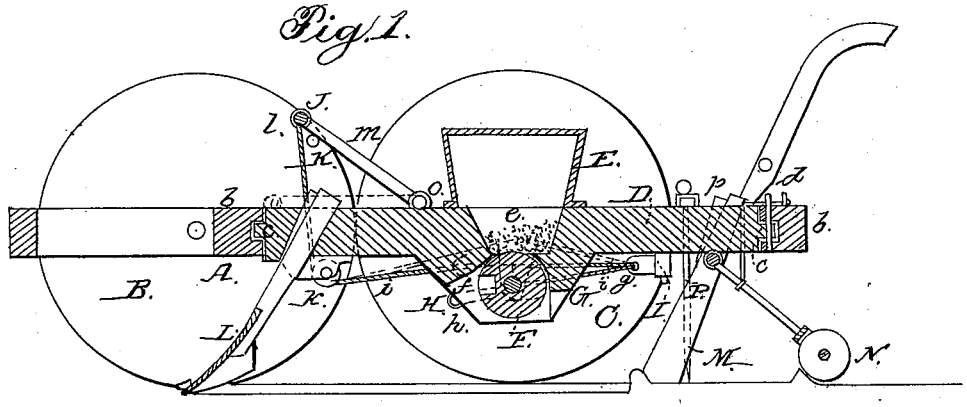
Figure 2:
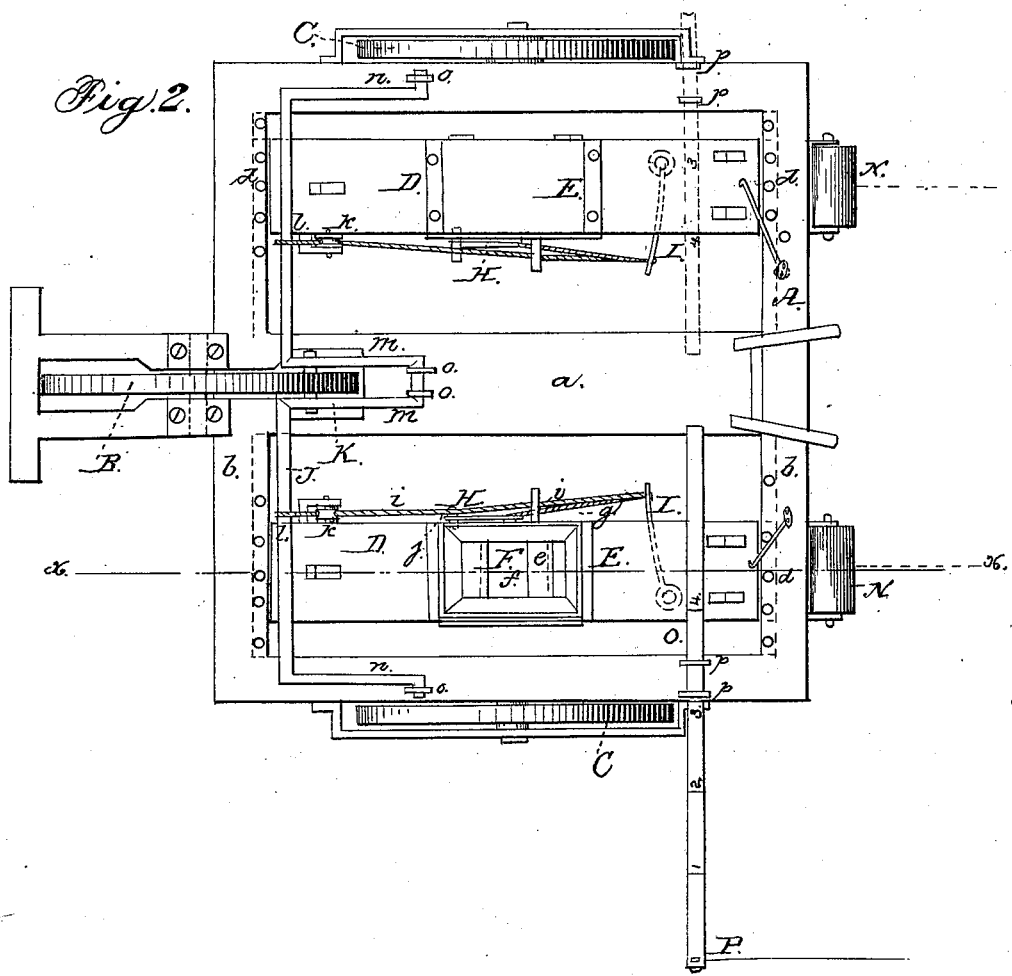

Figure 1 is a longitudinal vertical section of my improvement, $x\ x$ in Fig. 2 showing the plane of section. Fig. 2 is a plan or top view of the same.

Similar letters of reference indicate corresponding parts in the two figures.

The nature of my invention consists in arranging the seed-hoppers and seed-cylinders and the mechanism which operates the seed-cylinders upon movable bars, in combination with the double crank and frame, in the manner and for the purpose presently set forth.

To enable those skilled in the art to fully understand and construct my invention, I will proceed to describe it.

A represents a horizontal rectangular frame, which may be constructed of wood or metal—wood will probably be oftener used. This frame has a center bar, $a$, fitted longitudinally within it. The front part of the bar $a$ is slotted, and a wheel, B, is fitted therein. Wheels C are also attached to the frame A, one at each side.

The tongue or draft-pole (not represented) is attached to the front end of the bar $a$.

The inner sides of the front and back pieces $b\ b$ of the frame A are grooved longitudinally, and the ends of two bars, D D, are fitted in said grooves. The ends of the bars D D have tenons $c$ formed on them, the said tenons fitting in the grooves, as shown clearly in Fig. 1.

The bars D D may be moved in the frame A and placed at any desired distance apart, and may be secured at any desired point by pins $d$, or any proper fastening.

On each of the bars D a seed-hopper, E, is is placed, and a mortise or opening, $e$, is made through each bar D, the openings being within the hoppers.

Underneath each bar D a wheel or cylinder, F, is placed. These wheels are fitted in boxes or frames G, attached to the under sides of the bars D, the upper edges of the wheels being on a level with the lower parts of the mortises or openings $e$, as shown clearly in Fig. 1.

The peripheries of the wheels F have each a recess, $f$, made in them, and the axes of these wheels project through the inner sides of the frames or boxes G, and each has a forked arm, H, attached. To the back part of each bar D spring I is attached, and these springs are connected by cords $g$ to one of the prongs $h$ of the arms H. Cords $i$ are also attached to the outer ends of the springs I. These cords are attached to the other prongs, $j$, of the arms H, the cords $i$ passing underneath pulleys $k$, attached to the inner sides of the bars D, and having their ends secured to loops $l$, which are fitted on a bar or shaft, J, at the front end of the frame A.

The bar or shaft J has arms $m\ m\ n\ n$ projecting from it at right angles, and the ends of these arms are fitted in bearings $o$ on the frame A. Two of these arms, $m\ m$, are placed one at each side of the wheel B, and a pin, K, passing transversely through the wheel B, near its periphery, acts upon the arms $m\ m$ and raises the bar or shaft J at each revolution of the wheel B. As the machine is drawn along, when the pin K raises the bar or shaft J the cords $i$ actuate the arms H and throw the recesses $f$ in the peripheries of the wheels F forward and from underneath the openings $e$ in the bars D, and these recesses are thrown forward a sufficient distance to allow the seed to drop or fall out. (See Fig. 1.) When the pin K passes the arms $m\ m$ of the bar or shaft J the said bar or shaft is brought down upon the frame A and the wheels F thrown back to their original position by the springs I I. Thus it will be seen that the wheels F have a rotating reciprocating motion, the forward movement being produced by the action of the pin K in the wheel B, said pin raising the bar or shaft J, and the backward movement being produced by the springs I I when the pin K has passed the arms $m\ m$ of the bar or shaft J.

To the front ends of the bars D furrow-shares L are attached, one to each, and covering-shares M are also attached to the back ends of the bars D. A pressure-roller, N, is also attached to the back part of each bar D. The shares and pressure-rollers are of usual construction, and therefore do not require a minute description.

To each side of the frame A two guides or loops, p p, are attached, and O is a bar, which may be fitted in the loops at either side of the frame, the bar O projecting outward horizontally beyond the side of the frame A. In the end of the bar O a vertical rod, P, is fitted. The bar O, with rod P attached, serves as a gage, and when the machine is drawn along—two rows being planted at the same time, as two distributing-wheels, F, are used—the rod P will mark the ground at the proper distance from the side of the frame for one of the succeeding rows as the machine returns, and when the machine is turned for the succeeding "bout" the bar O of course is placed at the opposite side of the frame A.

In consequence of having the distributing-wheels F F work with a reciprocating rotating motion, the seed-hoppers E E are not so liable to clog, for the wheels F, as they work back and forth, have a tendency to loosen the grain or seed within the hopper, as there is a slight concussion at the termination of each movement.

Continuous-rotating distributing-wheels are in common use; but they are liable to pack or clog, especially if the seed be damp or moist.

It will be seen that as the ends of the cords $i$ are attached to the loops $l$, and as these loops are allowed to slide on the bar or shaft J, the bars D may be moved nearer together or further apart, as desired, without at all interfering with the working parts of the distributing device.

I would remark that one or more pins, K, may be used, according to the length of the spaces required between the hills.

What I claim as my invention, and desire to secure by Letters Patent, is—

Arranging the seed-hoppers and seed-cylinders and the mechanism which operate the seed-cylinders upon movable bars D, in combination with the double crank J and frame A, in the manner and for the purpose set forth.

FIRMAN GOODWIN.

Witnesses:
O. D. MUNN,
S. F. COHEN.